(12) United States Patent
Drumm et al.

(10) Patent No.: US 10,222,790 B2
(45) Date of Patent: Mar. 5, 2019

(54) PLANNING AND ENGINEERING METHOD, SOFTWARE TOOL AND SYSTEM FOR A PROCESS PLANT

(71) Applicant: Siemens Aktiengesellschaft, Munich (DE)

(72) Inventors: Oliver Drumm, Eggenstein-Leopoldshafen (DE); Henning Lenz, Karlsruhe (DE); Benjamin Lutz, Pfinztal (DE); Gerrit Wolf, Karlsruhe (DE)

(73) Assignee: Siemens Aktiengesellschaft, Munich (DE)

( * ) Notice: Subject to any disclaimer, the term of this patent is extended or adjusted under 35 U.S.C. 154(b) by 315 days.

(21) Appl. No.: 15/014,163

(22) Filed: Feb. 3, 2016

(65) Prior Publication Data

US 2016/0231737 A1    Aug. 11, 2016

(30) Foreign Application Priority Data

Feb. 11, 2015 (EP) .................................. 15154743

(51) Int. Cl.
*G05B 19/418* (2006.01)

(52) U.S. Cl.
CPC ................. *G05B 19/41885* (2013.01); *G05B 2219/13181* (2013.01); *G05B 2219/31368* (2013.01); *G05B 2219/32423* (2013.01); *G05B 2219/35215* (2013.01); *G05B 2219/40515* (2013.01); *Y02P 90/14* (2015.11); *Y02P 90/20* (2015.11); *Y02P 90/26* (2015.11)

(58) Field of Classification Search
CPC .......... H02J 2003/007; H02J 2003/003; G05B 13/041; G05B 2219/25387

USPC ..................................... 700/22, 23, 286, 291
See application file for complete search history.

(56) References Cited

U.S. PATENT DOCUMENTS

| 2007/0005266 | A1  | 1/2007  | Blevins et al. |
| 2007/0100478 | A1* | 5/2007  | Egeland .......... G05B 19/41865 700/45 |
| 2010/0274367 | A1  | 10/2010 | Kaufman et al. |

(Continued)

FOREIGN PATENT DOCUMENTS

| CN | 1950761   | 4/2007 |
| CN | 101807265 | 8/2010 |

(Continued)

OTHER PUBLICATIONS

Office Action dated Dec. 22, 2017 which issued in the corresponding Chinese Patent Application No. 201610079894.7.

*Primary Examiner* — Michael J Brown
(74) *Attorney, Agent, or Firm* — Cozen O'Connor

(57) ABSTRACT

A flowchart of a process plant is compiled by linking graphical process objects representing operator-controllable and observable facilities of the plant when planning a process plant, wherein the process in the process plant is simulated with reference to simulation models assigned to the graphical process objects during a simulation phase, where simulation models include energy consumption models that describe the electrical energy consumption of the respective facilities to be described as a function of measurable or known process variables in the plant and hence enable simulation and optimization of the automation with respect to electrical energy consumption and energy efficiency.

9 Claims, 4 Drawing Sheets

(56) References Cited

U.S. PATENT DOCUMENTS

2010/0299169 A1 11/2010 Schlereth et al.
2011/0252355 A1 10/2011 Nixon et al.
2012/0316852 A1 12/2012 Blank et al.
2013/0080131 A1 3/2013 Kaufman et al.

FOREIGN PATENT DOCUMENTS

| CN | 102713946 | 10/2012 |
|---|---|---|
| DE | 10 2008 040 440 A1 | 1/2010 |
| EP | 2 244 140 A2 | 10/2010 |
| WO | WO 2009/089849 A1 | 7/2009 |

\* cited by examiner

PLANNING AND ENGINEERING METHOD, SOFTWARE TOOL AND SYSTEM FOR A PROCESS PLANT

BACKGROUND OF THE INVENTION

1. Field of the Invention

The invention relates to a planning and engineering method for a process plant, a corresponding planning and engineering software tool, a planning and engineering system for a process plant, an automation system with a planning and engineering system of this kind and to a function block compiled in accordance with the method, the software tool or with the system.

2. Description of the Related Art

To perform the engineering for the automation of a process plant, in a planning and engineering system, a corresponding software tool usually determines the structure of the process plant in a first step and a plant planning tool compiles a flow chart of the plant by linking graphical process objects. The graphic process objects represent the functional, i.e., the operator-controllable and observable facilities of the plant, such as sensors, motors, pumps, valves, metering units and regulators or even also groups of such facilities, which are more closely related, such as the drying group of a paper machine or the cooling section of a continuous casting plant. The graphical process objects are generally included as standardized blocks in libraries and are placed on a configuration interface in accordance with technical viewpoints and connected to each other via a suitable editor.

The process control system (PCS) engineering is performed via a PCS engineering tool based on function blocks containing different automation functions in the form of software. The function blocks are generally prefabricated and tested block types for repeated functions organized in process control libraries. From these block types, it is possible to compile as many instance objects with individual instances as desired and link them by means of an editor via icons on a configuration interface using drag & drop to form a function chart of the plant. Every process object has a corresponding automation function block describing the automation function of the object and which is optionally assembled from a plurality of function blocks.

When all the functions have been compiled in the function chart, the engineering system translates the function-block software into a control program (machine code) that can be read by automation devices of the plant and which is loaded into the automation devices and implemented there within the context of the control of the technical process.

In order to be able to ascertain whether the engineering for the automation was successful or in order to optimize the engineering, it is possible to define test conditions in a separate test tool and perform a simulation of at least one test under the test conditions in a simulation tool. The process, or a subprocess, is virtually simulated by simulation models of the involved process objects in a simulated environment. The simulation tool generates signals for possible events and scenarios that could occur during the operation of the plant. A simulation tool of this kind is, for example, known under the name SIMIT from Siemens AG.

The aforementioned plant planning, engineering, test and simulation tools can be formed individually or combined.

WO 2009/0898949 A1 discloses one such planning and engineering method, software tool and system for a process plant.

An automation system for a process plant is also known from US 2007/005266 A1 which, for purposes of condition monitoring of the plant, acquires process parameters and process measurements and evaluates them via correlation and statistical methods. At the same time, it is possible inter alia to calculate material and energy flows and balances.

A planning and engineering method, software tool and system for a production line supplemented by energy efficiency planning is additionally known from DE 10 2008 040440 A1. Since the power consumption of the components of the production line is known, it is possible to plan the required energy for every process in the production line as a function of the production cycle times. Different energy flows can be determined in detail from models. The energy efficiency planning can be further optimized during the operation of the production plant with reference to measurements of the cycle time and the energy consumption of the components.

In a list of priorities, the development of an energy-optimized process plant frequently comes behind the actual engineering requirements for the process. The design of the electrical fuses and cable looms for the power supplied to the plant are defined according to the statutorily prescribed maximum loads and the information on the energy consumption of the individual plant components connected in the associated data sheets. Therefore, the energy design of the plant is performed without knowledge of the consumption pattern of the plant components. As a rule, the plant operator does not know the distribution of the energy costs in the plant or only knows this distribution very imprecisely. Neither is this information available from the plant's control system. It is only possible to measure the overall energy consumption of the plant at the feed-in point via a meter. In individual cases, there are also plant components that provide consumption values during the running time of the plant. However, such components are always more expensive than the standard components that are used. To enable decentralized power monitoring, the plant can also be retrofitted with power measuring devices upstream of the respective consumers. However, such measuring devices and the installation thereof increase the overall costs of a plant.

The dynamic energy consumption of a plant is also definitively influenced by the automation. As a result, this parameter should be used as a basis for optimization during the engineering of a plant and taken into account accordingly.

SUMMARY OF THE INVENTION

It is therefore an object of the invention to provide a planning and engineering method, a planning and engineering software tool, a planning and engineering system, an automation system with the planning and engineering system, and a function block for an automation device compiled in accordance with the method the software tool or with the planning and engineering system.

These and other objects and advantages are achieved in accordance with the invention by a planning and engineering method for a process plant with which, in a plant planning phase, a flow chart of the plant is compiled via a plant planning tool by linking graphic process objects representing operator-controllable and observable facilities of the plant and, in a simulation phase, the linked process objects of the plant or of a part of the plant are imported via a simulation tool and the process in the plant or the part of the plant is simulated with reference to simulation models assigned to the imported process objects. In accordance with the invention, for at least a part of the process objects representing electrically operated facilities of the plant, during compilation, the assigned simulation models are each supplemented by an energy consumption model describing the electrical energy consumption of the facility as a function of measurable or known process variables in the plant and, in the simulation phase, the electrical energy consumption of the facilities represented by the imported process objects is simulated.

As early as the planning stage (e.g., using the software solution COMOS from Siemens), the facilities that can be influenced by the automation facilities (e.g., motors, valves, pumps, compressors, or ventilators) of the process plant are identified as electrical energy consumers and taken into account appropriately during the subsequent engineering and later operation of the plant. In a simulated environment (e.g., SIMIT from Siemens), the process is simulated by simulation models of the facilities of the plant. In addition to the behavior of the facilities, in order to also enable the evaluation of their energy consumption, the simulation models are expanded by energy consumption models with the aid of which the automation can be optimized with respect to energy efficiency. The simulation of the electrical energy consumption of the facilities of the plant is based on descriptions of the facilities and their behavior as a function of process variables, which are either known or typically measured. Examples of such process variables are the flow rate and pressure of material flows or rotational speeds of rotating devices. The descriptions of the facilities and their behavior are based on information from data sheets, such as characteristic curves. For example, the electrical power consumption of a pump depends upon the flow rate, pressure difference, temperature and nature of the medium to be pumped and that of a motor upon, inter alia, its rotational speed. Based on the energy consumption model, it is now possible for the automation of the facilities of the plant to be optimized with respect to energy consumption and/or energy efficiency in a simulated environment.

In an embodiment of the planning and engineering method in accordance with the invention, in an engineering phase, an engineering tool is used to compile a function chart of the plant by linking icons of function blocks, where an automation function block describing the automation function of the process object corresponds to each process object, and the automation function blocks are loaded into automation devices of the plant for implementation. In accordance with the invention, for process objects the assigned simulation models of which are supplemented by an energy consumption model, the corresponding automation function block is supplemented by an energy consumption function derived by specialization from the energy consumption model and formed to estimate the current electrical energy consumption of the facility during its running time in the plant, and the automation function blocks are loaded into automation devices of the plant for implementation.

Following optimization of the energy consumption or energy efficiency by simulation, the process objects are transferred to the PCS engineering (e.g., PCS 7 from Siemens). In order to also enable acquisition, evaluation and long-term monitoring of energy consumption on a long-term basis in the real plant, the automation function blocks are expanded by energy consumption functions. These energy consumption functions are specializations of the aforementioned energy consumption models by expansion with control-specific running time aspects (e.g., organizational blocks with the aid of which program parts are implemented selectively and effect cyclic program processing). When implemented in the automation devices, the specialization also means code transformation from the energy consumption model (e.g., compiled with the component type editor SIMIT CTE) into the energy consumption function (e.g., into Structured Control Language (SCL)). This transformation has the advantage that the energy consumption function does not have to be re-applied. The energy consumption functions are embedded in the automation and continuously and concurrently calculate the energy consumption of the units during the operation of the plant with reference to the manipulated and measured values available in the automation. This enables the estimation of the current energy consumption of individual units in the plant or of parts of the plant without any additional sensor technology being required for this purpose. This means that even units without energy consumption meters can provide information on their consumption, where the present consumption is, for example, visualized by a trend graph and/or stored in a long-term archive. Correlations between the automation behavior and the energy consumption determined enables condition monitoring of the plant. For example, switching a pump on or off during operation automatically results in increased/reduced energy consumption of the plant. Increased energy consumption can also occur due to advanced wear. The consumers connected are also known from the automation technology. Consequently, it is possible to differentiate between normal consumption and wear-induced consumption.

Therefore, the invention not only enables a process plant to be planned with respect to energy optimization but also for it to be operated in an energy-optimized way. The invention also enables condition monitoring during the running time via monitoring and localization of the energy consumption of the operator-controllable and observable units in the plant. The monitoring of trends and key performance indicators (KPIs) can, for example, be performed by suitable energy-management software (for example, SIMATIC powerrate) in a maintenance station or the operating and observation device of the automation system and can trigger an alarm or a maintenance instruction in the event of prespecified tolerance bands being exceeded.

Summarizing, the above-described invention includes the following aspects:
Modeling
  i) Generation of models for energy consumption in a simulation environment (for example, SIMIT).
  ii) Provision of parameter information for the configuration of the energy consumption models by the planning and engineering system.
  iii) Use of process variables from the process control system or automation system (e.g., PCS 7) as input for the energy consumption models.
Virtual Optimization of the Energy Consumption in a Simulation Environment
Monitoring and Optimization in the Real Plant Operation
  i) Expansion of the function blocks (FBs) of the automation by energy consumption functions.
  ii) Transfer of the energy consumption models (e.g., in SIMIT CTE) to energy consumption functions (e.g., in SCL) including the associated code transformation.
  iii) Integration of the energy consumption values acquired within higher-ranking control systems (DCS, MES) enabling the implementation of optimization.

The above-described invention provides the following advantages:

i) In conjunction with the monitoring of energy flows in a plant, cost saving is achieved by dispensing with additional sensor technology for power/energy measurement.
ii) There is no need for complex retrofitting of the plant with additional sensors and the integration thereof in the plant.
iii) Energy-optimized design and operation of the plant is enabled.
iv) The energy consumption can be optimized virtually, i.e., even before commissioning.
v) Monitoring the energy flows over time also enables the detection of errors and wear on devices or consumers in the plant.
vi) The automation system includes its own energy monitoring system as part of its architecture. The online monitoring blocks are generated automatically.
vii) Errors and failures in the plant can be predicted and prevented during the running time when the simulation identifies, for example, that energy consumption or electric currents exceed pre-specified maximum values.
viii) Linking the energy monitoring system with an electricity exchange enables processes, for example batch processes, to be run at optimal cost.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The following describes the invention with reference to exemplary embodiments and to the figures in the diagram, in which.

DETAILED DESCRIPTION OF THE PRESENTLY EXEMPLARY EMBODIMENTS

Figure 1:
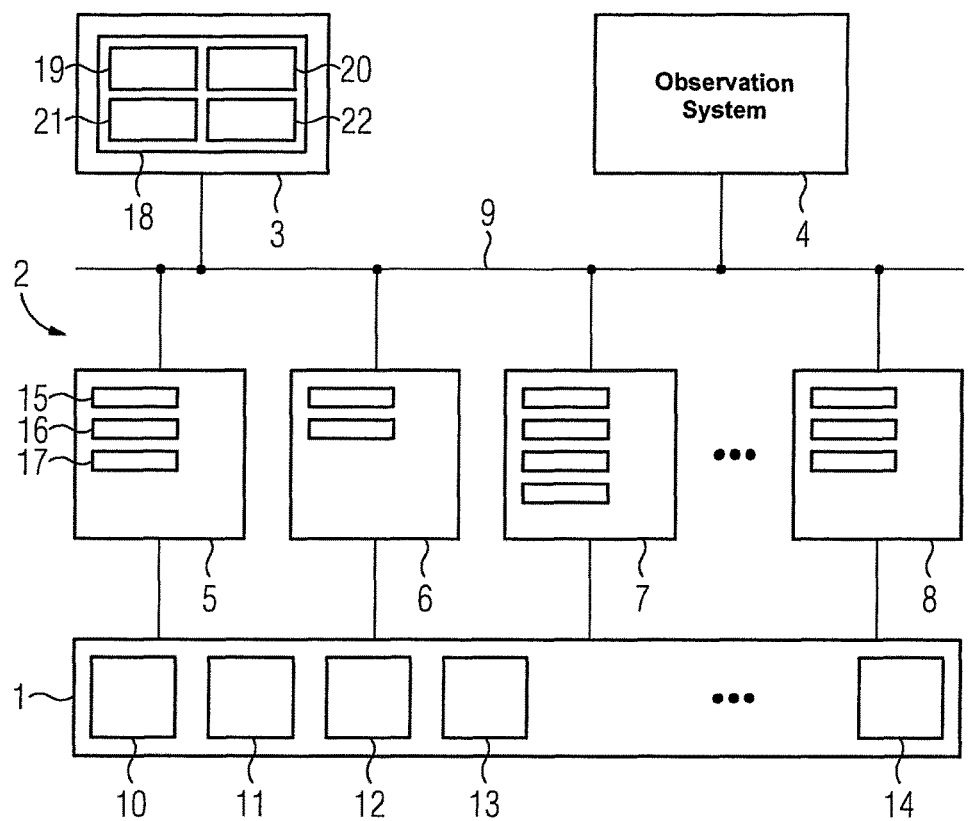
FIG. 1 an exemplary process plant.

FIG. 1 is a simplified schematic representation of a process plant in which a process 1 is controlled via an automation system 2. The automation system includes a planning and engineering system 3, an operator-controllable and observation system 4 and a plurality of automation devices 5, 6, 7, 8 connected to each other via a bus system 9. The automation devices 5, 6, 7, 8 control the technical process 1 in accordance with a control program comprising a plurality of interacting automation function blocks 15, 16, 17 distributed between the automation devices 5, 6, 7, 8. The automation devices 5, 6, 7, 8 are assigned to different operator-controllable and observable facilities 10, 11, 12, 13, 14, wherein, for example, the automation function block 15 in the automation device 5 controls a pump 11.

The planning and engineering system 3 includes a planning and engineering software tool 18 comprising different software tools, here a plant planning tool 19, an engineering tool 20, a simulation tool 21 and a test tool 22. In FIG. 1, for greater clarity, the software tool 18 is depicted as a block on an engineering station 3. This should not be understood as meaning that the software tool 18 can only run on a computing unit. Instead, it should be understood the software tool 18 can be distributed between different computing units. The software tools 19, 20, 21, 22 can also be formed individually or combined together.

Figure 2:
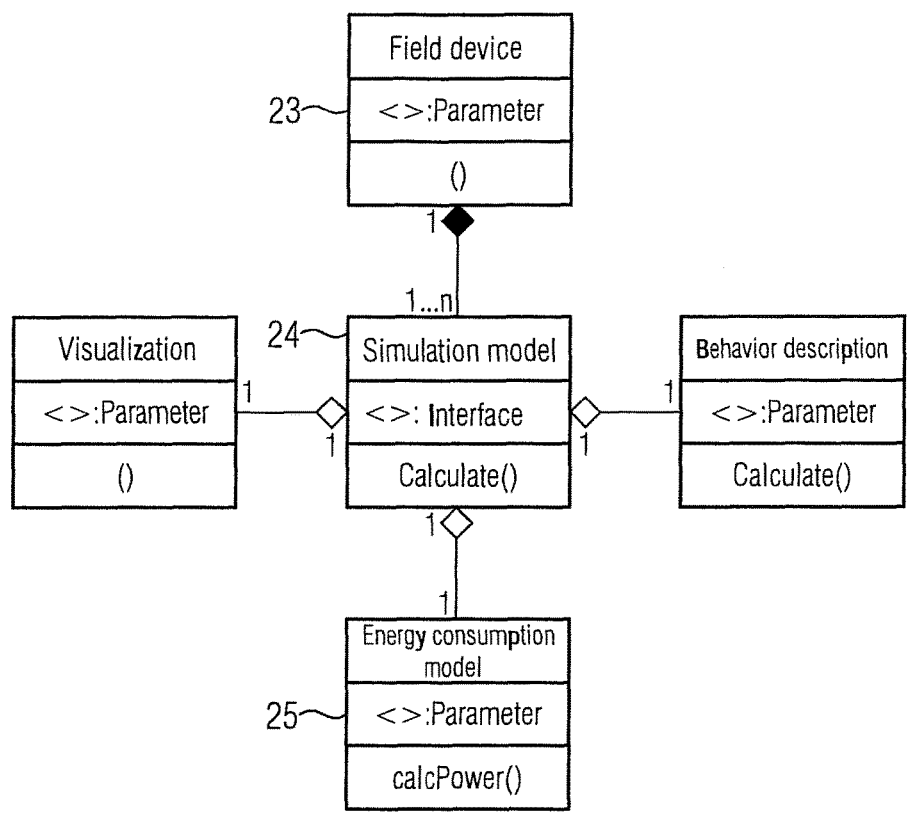
FIG. 2 is an example of the expansion of the simulation model of an operator-controllable and observable facility of the plant by an energy consumption model in accordance with the invention.

In a plant planning phase, the plant planning tool 19 is used to compile a flowchart of the plant by linking graphical process objects representing the operator-controllable and observable facilities (field devices) 10, 11, 12, 13, 14 of the plant. FIG. 2 shows an UML class diagram with a graphical process object 23 of this kind. In a simulation phase, the linked graphical process objects of the plant or of a part of the plant are imported via the simulation tool 21 and the process 1 in the process plant or the part of the plant is simulated with reference to simulation models assigned to the imported graphical process objects. The graphical process object 23 shown here represents an electric consumer, here, for example, a pump, and therefore the assigned simulation model 24 includes an energy consumption model 25 describing the electrical energy consumption of the pump as a function of measurable or known process variables in the plant. The parameters for the configuration of the energy consumption model 25 are provided by the planning and engineering software tool 18.

Figure 3:
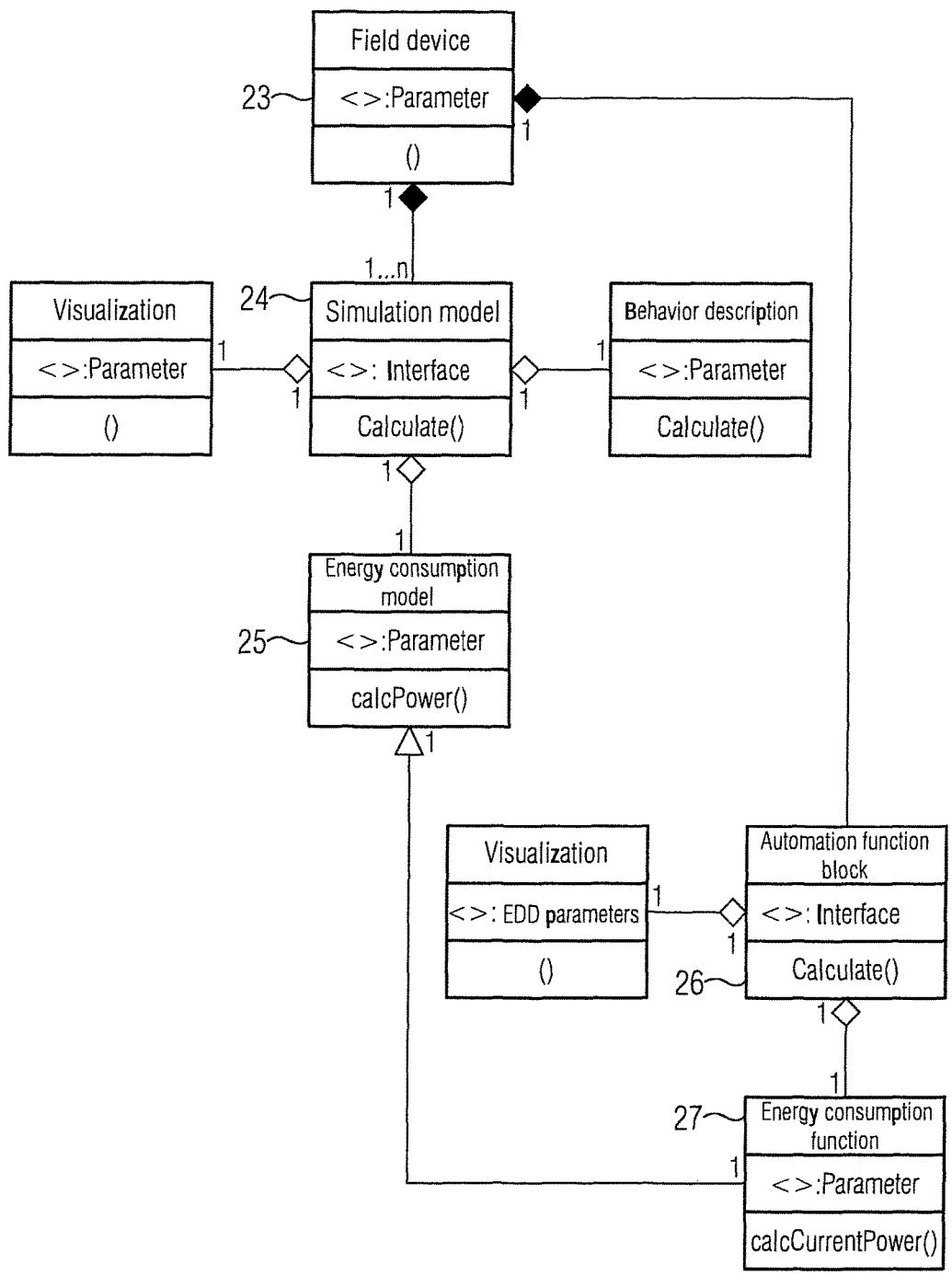
FIG. 3 is an example of the expansion of an automation function block by an energy consumption function.

In an engineering phase, the engineering tool 20 is used to compile a function chart of the plant by linking icons of function blocks, where, as FIG. 3 shows, each graphical process object 23 has a corresponding automation function block 26 describing the automation function of the graphical process object 23. The automation function block 26 includes an energy consumption function 27 that forms a specialization of the energy consumption model 25 and describes the electrical energy consumption during the runtime of the facility represented by the graphical process object 23. When all the functions have been compiled in the function chart, the planning and engineering system 3 translates the function-block software into a control program (machine code) that can be read by the automation devices 5, 6, 7, 8 of the plant and which is loaded into the automation devices 5, 6, 7, 8 and implemented there within the context of the control of the technical process 1.

In accordance with the invention, energy consumption functions for the automation function blocks are thus derived from the energy consumption models of the simulation. The energy consumption functions are used to calculate or estimate the current electrical energy consumption of the facilities assigned to the automation function blocks so that no corresponding hardware sensor technology is required to measure the energy consumption. Therefore, not only is the energy consumption of the different operator-controllable and observable facilities modeled for purposes of plant planning and simulation, but specialization of this modeling also generates energy consumption functions, which are written into the automation function blocks together with the automation functions and loaded into the automation devices of the plant for implementation. This enables the energy consumption in the process to be estimated on the spot instead of being measured but also to be communicated and processed in the automation system like the measurements received by the automation devices.

Figure 4:
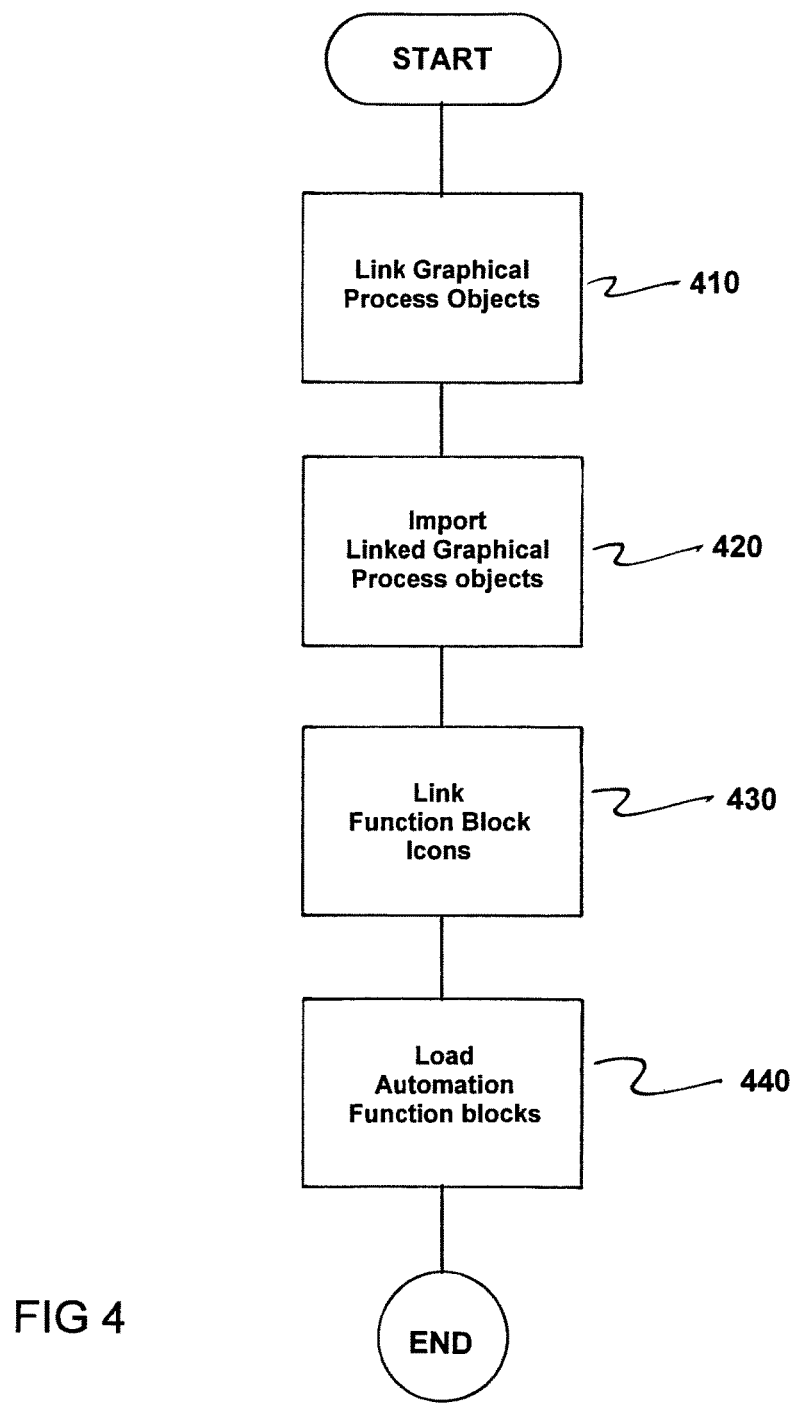
FIG. 4 is a flowchart of the method in accordance with the invention.

FIG. 4 is a flowchart of a planning and engineering method for a process plant. The method comprises linking graphical process objects (23) representing operator-controllable and observable facilities (10-14) of the process plant to compile a flow chart of the process plant via a plant planning tool (19) during a plant planning phase, as indicated in step 410.

Next, the linked graphical process objects (23) of the process plant or a part of the process plant are imported via a simulation tool (21) during a simulation phase and a process (1) in the process plant or a part of the process plant with reference to simulation models (24) assigned to the imported graphical process objects (23) are simulated during the simulation phase, as indicated in step 420.

Icons of function blocks are now linked to compile a function chart of the process plant by an engineering tool (20) during an engineering phase, as indicated in step 430. Here, each graphical process object (23) including a corresponding automation function block (26) describes an automation function of the graphical process object (23).

Next, automation function blocks (26) are loaded into automation devices (5-8) of the plant for implementation, as indicated in step 440.

In accordance with the invention, for at least a part of the graphical process objects (23) representing electrically operated facilities (10-14) of the process plant, the assigned simulation models (24) are each supplemented by an energy consumption model (25) describing an electrical energy consumption of an observable facility (10-14) as a function of measurable or known process variables in the process plant. In addition, the electrical energy consumption of the facilities (10-14) represented by the imported graphical process objects (23) is simulated in the simulation phase. Moreover, for graphical process objects (23) for which the assigned simulation models (24) are supplemented by an energy consumption model (25), a corresponding automation function block (26) is supplemented by an energy consumption function (27) which is derived by specialization from the energy consumption model (25) and is formed to estimate a current electrical energy consumption of the observable facility (10-14) during its run-time in the process plant.

Thus, while there have been shown, described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A planning and engineering method for a process plant, the method comprising:
    linking graphical process objects representing operator-controllable and observable facilities of the process plant to compile a flow chart of the process plant via a plant planning tool during a plant planning phase;
    importing the linked graphical process objects of the process plant or a part of the process plant via a simulation tool during a simulation phase and simulating a process in the process plant or the part of the process plant utilizing simulation models assigned to the imported graphical process objects during the simulation phase;
    linking icons of function blocks to compile a function chart of the process plant by an engineering tool during an engineering phase, each graphical process object including a corresponding automation function block describing an automation function of the graphical process object; and
    loading automation function blocks into automation devices of the plant for execution;
    wherein, for at least a part of the graphical process objects representing electrically operated ones of the facilities of the process plant, the assigned simulation models are each supplemented by an energy consumption model describing an electrical energy consumption of the facility represented by the graphical process object as a function of measurable or known process variables in the process plant;
    wherein the electrical energy consumption of the facilities represented by the imported graphical process objects for which the assigned simulation models are supplemented by the energy consumption model is simulated in the simulation phase; and
    wherein, for at least one of the graphical process objects for which the assigned simulation models are supplemented by an energy consumption model, the corresponding automation function block is supplemented by an energy consumption function which is derived by specialization from the energy consumption model and is formed to estimate a current electrical energy consumption of the observable facility during its run-time in the process plant.

2. A planning and engineering method of claim 1, wherein the method compiles a function block for an automation device.

3. A planning and engineering software tool for a process plant, comprising:
    a plant planning tool configured to compile a flow chart of the plant by linking graphical process objects representing operator controllable and observable facilities of the plant during a process plant planning phase;
    a simulation tool configured to import the linked graphical process objects of the process plant or of a part of the process plant during a simulation phase and configured to simulate a process in the process plant or the part of the process plant utilizing simulation models assigned to the imported graphical process objects during the simulation phase; and
    an engineering tool configured to compile a function chart of the plant by linking icons of function blocks during an engineering phase, an automation function block describing the automation function of the graphical process object corresponding to each graphical process object and being further formed to load the automation function blocks into automation devices of the process plant for execution;
    wherein, for at least a part of the graphical process objects representing electrically operated one of the facilities of the process plant, the assigned simulation models are each supplemented by an energy consumption model describing an electrical energy consumption of the facility represented by the graphical process object as a function of measurable or known process variables in the plant;

wherein the simulation tool is further configured to simulate the electrical energy consumption of the facilities represented by the imported graphical process objects for which the assigned simulation models are supplemented by the energy consumption model during the simulation phase; and wherein, for at least one of the graphical process objects for which the assigned simulation models are supplemented by an energy consumption model, the corresponding automation function block is supplemented by an energy consumption function representing a specialization of the energy consumption model and which is formed to estimate an current electrical energy consumption of the observable facility during its runtime in the process plant.

4. The planning and engineering software tool for the process plant of claim 3, wherein the planning and engineering software tool compiles a function block for an automation device.

5. A planning and engineering system for a process plant, wherein the planning and engineering system is configured to:
- link graphical process objects representing operator-controllable and observable facilities of the plant to compile a flowchart of the process plant during a process plant planning phase;
- simulate a process in the process plant or a part of the process plant utilizing simulation models assigned to the graphical process objects during a simulation phase; and
- compile a function chart of the plant by linking icons of function blocks during an engineering phase, an automation function block describing the automation function of a graphical process object corresponding to each graphical process object and to load the automation function blocks into automation devices of the plant for execution;

wherein, for at least a part of the graphical process objects representing electrically operated ones of the facilities of the process plant, the assigned simulation models are each supplemented by an energy consumption model describing an electrical energy consumption of the facility represented by the graphical process object as a function of measurable or known process variables in the process plant;

wherein the planning and engineering system is further configured to simulate an electrical energy consumption of the observable facilities represented by the imported graphical process objects for which the assigned simulation models are supplemented by the energy consumption model during the simulation phase; and wherein, for at least of the graphical process objects for which the assigned simulation models are supplemented by an energy consumption model, the corresponding automation function block is supplemented by an energy consumption function representing a specialization of the energy consumption model and which is formed to estimate a current electrical energy consumption of the observable facility during its runtime in the process plant.

6. An automation system for a process plant having the planning and engineering system as claimed in claim 5.

7. The automation system as claimed in claim 6, wherein the automation function blocks loaded into the automation devices use the energy consumption function to determine the current electrical energy consumption of the observable facilities during the operation of the process plant.

8. The automation system as claimed in claim 7, wherein the automation system is configured to perform condition monitoring of the plant by correlations between automation behavior and the determined current electrical energy consumption.

9. The planning and engineering system for the process plant of claim 5, wherein the planning and engineering system compiles a function block for an automation device.

* * * * *